United States Patent
Barr et al.

Patent Number: 6,056,792
Date of Patent: May 2, 2000

[54] COMBUSTION

[75] Inventors: Donald Barr, South Wirral; Stephen L. Cook, Chester; Paul J. Richards; Maurice W. Rush, both of Buckinhamshire, all of United Kingdom

[73] Assignee: The Associated Octel Company Limited, United Kingdom

[21] Appl. No.: 08/945,375

[22] PCT Filed: Apr. 24, 1996

[86] PCT No.: PCT/GB96/00990

§ 371 Date: Feb. 13, 1998

§ 102(e) Date: Feb. 13, 1998

[87] PCT Pub. No.: WO96/34074

PCT Pub. Date: Oct. 31, 1996

[30] Foreign Application Priority Data

Apr. 24, 1995 [GB] United Kingdom ............... 9508247
Apr. 24, 1995 [GB] United Kingdom ............... 9508282

[51] Int. Cl.[7] ........................................... C10L 1/18
[52] U.S. Cl. ................. 44/403; 44/362; 44/363; 44/365
[58] Field of Search ................ 44/351, 358, 362, 44/363, 365, 403

[56] References Cited

U.S. PATENT DOCUMENTS 5,304,783  4/1994  Clough et al. ..................... 219/543

FOREIGN PATENT DOCUMENTS

| 0 141 998 | 5/1985 | European Pat. Off. . |
| 0 207 560 | 1/1987 | European Pat. Off. . |
| 0 423 744 | 4/1991 | European Pat. Off. . |
| 0 476 196 | 3/1992 | European Pat. Off. . |
| 0 507 590 | 10/1992 | European Pat. Off. . |
| 0 555 006 | 8/1993 | European Pat. Off. . |
| 0 590 814 | 4/1994 | European Pat. Off. . |
| 20 29 804 | 12/1970 | Germany . |
| 40 41 127 | 2/1992 | Germany . |
| 2 248 068 | 3/1992 | United Kingdom . |
| 2248068 | 3/1992 | United Kingdom . |
| 92 20762 | 11/1992 | WIPO . |
| 94 11467 | 5/1994 | WIPO . |
| 95 04119 | 2/1995 | WIPO . |

Primary Examiner—Jacqueline V. Howard
Assistant Examiner—Cephia D. Toomer
Attorney, Agent, or Firm—Nixon & Vanderhye

[57] ABSTRACT

A process of improving the oxidation of carbonaceous products derived from the combustion of fuel and improving combustion of a fuel is described. The process comprises adding to the fuel before combustion thereof a composition comprising at least an organo-metallic complex of a Group I or Group II metal characterized in that the concentration of the complex in the fuel before combustion is 30 ppm or less.

21 Claims, 3 Drawing Sheets

TYPICAL 3M DIESEL FILTER CARTRIDGE

FIG. 1

FIG. 2 TYPICAL 3M DIESEL FILTER CARTRIDGE

FIG. 3

COMBUSTION

The present invention relates to a process for improving the oxidation of carbonaceous products derived from the combustion or pyrolysis of fuel (such as with the use of a particulate trap for use with diesel engines) and/or for improving the combustion of fuel.

Products from the combustion or pyrolysis of diesel fuels include carbon monoxide, nitrous oxides ($NO_x$) unburnt hydrocarbons and particulates. Particulates are becoming increasingly regarded as serious pollutants, in that there is a growing recognition of the health risks associated with particulates emissions. These particulates include not only those which are visible as smoke emission, but also unburned and partially oxidised hydrocarbons from fuel and the lubricants used in diesel engines.

Diesel engines are prone to emission of high levels of particulate matter when the engine is overloaded, worn or badly maintained. Particulate matter is also emitted from diesel engines exhausts when engines are operated at partial load although these emissions are normally invisible to the naked eye. The unburned or partially oxidised hydrocarbons also emitted to the atmosphere are irritant astringent materials. Further, in a problem recently highlighted for diesel fuel, emissions of particulate matter of less than 10 micrometers principle dimension ("PM10 matter"), is claimed to cause 10,000 deaths in England and Wales and 60,000 deaths in the USA annually, as published in the New Scientist, March 1994, p12. It is suspected that these smaller particles penetrate deeply into the lung and lodge.

As indicated, particulate emission by diesel engines is a major source of harmful atmospheric pollution, and an effective method to control particulate emissions from diesel engines is highly sought after. Legislation now exists in many countries of the World designed to control pollution from diesel engines. More demanding legislation is planned.

Prior activity in the area of reducing the level of particulates may be regarded as using one of two strategies: engine design and management solutions or trap oxidation solutions.

Engines that have been developed to achieve low levels of emission are well known to those familiar with the art and examples of such designs are given in S.A.E. International Congress (February 1995) S.A.E. Special Publication SP-1092. The drawbacks to the various engine management solutions include cost, complexity and the poor capability for retrofitting.

Traps fitted to diesel engines have been proposed as a solution but these normally require some external energy input for regeneration. Such devices are well known to those familiar with the art and some examples are discussed in "Advanced techniques for thermal and catalytic diesel particulate trap regeneration", SAE International Congress (February 1985), SAE Special Publication-42 343–59 (1992) and S.A.E. International Congress (February 1995) and S.A.E. Special Publication SP-1073 (1995). In addition to the need for supplying an external heat source, the trap oxidation solutions suffer from similar problems. They are also prone to cause trap blockage and/or 'chimney fires' resulting from sudden and intense burnoff of soot from highly loaded traps.

Catalytic devices can assist the control of emissions from diesel engines but require low sulphur fuel (<500 ppm) to enable benefits to exhaust emission to be achieved.

Additives can be used to contribute to both strategies. In engine management approaches, there is a well-known trade-off between $NO_x$ and particulates emissions. Diesel engines emissions tests now include specified levels for all pollutants. An additive which achieves some useful level of particulates suppression to some extent decouples this trade off, thereby giving the engineer more freedom to achieve power output or fuel economy within a given emission standard.

The use of metal-based additives within diesel fuels for these ends are well known. However, the known additives can present a number of drawbacks.

For example, some previous solutions have overlooked the consequence of the potential for emissions of the metals from the engine or the trap. Even the best of traps cannot be 100% efficient at trapping particles and therefore some metal will be emitted. As a consequence, where toxic metals are employed, it must always be doubtful that an overall emissions benefit is so obtained. In addition, previous attempts have used relatively high dose rates of metals, typically of the order of 50–100 ppm or more. This has several drawbacks as a greater mass of solids may ultimately be emitted by the engine and a more rapid blockage of a trap may thus result. Unwanted deposits may also be formed within the engine, ultimately to the detriment of performance. Furthermore, previous attempts have used metals which give combustion or pyrolysis products, or yield species within the trap that are both involatile and of low or very low water solubility. As a consequence, blockage of the exhaust system, or more likely the oxidation trap, leads to a need for disposal or expensive recycling of the trap. Also, previous attempts have used additive metals which may give rise to products antagonistic towards the trap or exhaust system components.

WO-A-94/11467 to Platinum Plus discloses the use of platinum compounds in conjunction with a trap to lower the unburned hydrocarbon and carbon monoxide concentration of diesel exhaust gases. Lithium and sodium compounds are also claimed to be useful in lowering the regeneration temperature of the trap. No engine data is supplied in support of this claim. The teaching of this patent is that lithium and sodium organic salts are available and suitable for use to the extent that they are fuel soluble and are stable in solution. There is no suggestion that any salt of a given metal performs better than any other salt of that metal.

WO-A-92/20762 to Lubrizol describes an array of chelating functionalities with an extensive range of metals as fuel additives capable of lowering the ignition temperature of particulates caught within a trap. No engine data is given to support this contention. Example complexes are given for copper only. The Application teaches the use of an antioxidant additive in conjunction with the metal complex to be essential. No evidence is given that the complexes are effective in the absence of this additive, that alkali or alkaline earth metals are at all effective, nor that any one fuel soluble and stable complex or salt may perform differently to any other.

DE-A-40 41 127 to Daimler-Benz describes the use of various fuel soluble, stable lithium and sodium salts in reducing the ignition temperature of the mateial retained within a diesel particulate filter. Frequent partial unblocking of the filter is observed at sodium levels of around 32 ppm m/m, 28 ppm m/m with lithium. There is no suggestion that any one fuel soluble, stable salt performs better than any other; in fact, the examples given stress the similarity of the results obtained between one additive and another.

WO-A-95/04119 to Associated Octel describes the use of Lewis base coordinated alkali and alkaline earth metal salts in reducing diesel engine exhaust emissions. The salt complexes have the advantage of being fuel soluble and stable.

The Application contains some speculation that such additives may be effective to catalyse the oxidation of trapped particulates. However, it presents no evidence to support this, and further, does not teach that any one additive may be any more effective than any other.

DE-A-20 29 804 to Lubrizol discloses the use of oil soluble carboxylic dispersants to reduce the formation of deposits on inlet valves. There is no suggestion that the additives may remove previously formed deposits. The teaching is that any emissions benefit arises purely from maintaining the cleanliness and, as a result, the designed function of the engine.

EP-A-207 560 to Shell concerns the use of succinic acid derivatives and their alkali or alkaline earth metal (especially potassium) salts as additives for increasing the flame speed within spark ignition internal combustion engines. However, there is no teaching regarding the use of such additives in compression ignition engines.

EP-A-555 006 to Slovnaft AS discloses the use of alkali or alkaline earth metal salts of derivatised alkenyl succinates as additives for reducing the extent of valve seat recession in gasoline engines designed for leaded fuel but used with non-leaded.

GB-A-2 248 068 to Exxon teaches the use of additives containing an alkali, an alkaline earth and a transition metal to reduce smoke and particulate emissions during the combustion of diesel fuel. According to the teaching of this document, the presence of a transition metal is essential. There is no teaching regarding efficacy for trap regeneration, or that any one salt of a given metal performs better than any other.

EP-A-0 476 196 to Ethyl Petroleum Additives teaches the use of a three part composition including a soluble and stable manganese salt, a fuel soluble and stable alkali or alkaline earth metal and a neutral or basic detergent salt to reduce soot levels, particulates, and the acidity of carbonaceous combustion products. There is no suggestion that any particular fuel soluble, stable alkali or alkaline earth metal additive performs better than another.

EP-A-0 423 744 teaches the use of a hydrocarbon soluble alkali or alkaline earth metal containing composition in the prevention valve seat recession in gasoline engines designed for leaded but run on unleaded fuel. There is no teaching in this document relevant to diesel combustion.

The present invention seeks to improve the combustion of diesel fuel in an engine combustion chamber but primarily to provide an additive which catalyses the oxidation of soot within the trap thereby reducing the so-called 'light off temperature'. In particular the present invention seeks to overcome one or more of the problems associated with the known fuel additives.

According to a first aspect of the present invention there is provided a process for improving the oxidation of carbonaceous products derived from the combustion or pyrolysis of fuel (such as with the use of a particulate trap for use with diesel engines), the process comprising adding to the fuel before the combustion thereof a composition comprising at least an organo-metallic complex of a Group I metal or at least an organo-metallic complex of a Group II metal, or a mixture thereof, characterised in that the concentration of the metal of the Group I and/or the Group II organo-metallic complex in the fuel before combustion is 100 ppm or less preferably 30 ppm or less ; and wherein the organo-metallic complex induces acceptable spontaneous trap regeneration according to the Test Protocol presented in the Examples. The process may additionally improve combustion of the fuel.

According to a second aspect of the present invention there is provided a use of an organo-metallic complex as defined in the first aspect of the present invention for improving combustion of fuel and/or improving the oxidation of carbonaceous products derived from the combustion or pyrolysis of fuel (such as with the use of a particulate trap for use with diesel engines), wherein the complex is added to the fuel before the combustion thereof and wherein the concentration of the metal of the Group I and/or the Group II organo-metallic complex in the fuel before combustion is 100 ppm or less, preferably 30 ppm or less, more preferably 10 ppm or less, yet more preferably 5 ppm or less.

Many types of particulate traps are known to those skilled in the art including as non-limiting examples 'cracked wall' and 'deep bed' ceramic types and sintered metal types. The invention is suitable for use with all particulate traps; the preferred concentration of metal in the fuel is a function of trap design, probably surface area to volume ratio. For a 'deep bed' filter trap, such as one constructed from 3M Nextel™ fibre, the concentration of metal in the Group I and/or Group II metal complex in the fuel is more preferably 30 ppm or less. For a ceramic monolith type or 'cracked wall' type filter trap, such as the Corning EX80™, the concentration of metal in the Group I and/or Group II metal complex in the fuel is more preferably 30 ppm or less.

The key advantages of the present invention are that the composition can achieve improved regeneration of traps (such as diesel engine particulate traps) and/or improved combustion in engines (such as diesel engines) at low dosages in the fuel. Further advantages are that the additive is readily fuel soluble and can be provided at high concentrations in fuel miscible solvent. Yet a further advantage is that the additives are particularly stable with respect to water and thus resistant to water leaching. The invention thus provides a composition that is very compatible with fuel handling, storage and delivery. In particular, diesel often encounters water, especially during delivery to the point of sale, and so leaching resistant or stable compositions are beneficial.

The low dosage aspect is particularly advantageous as the present invention utilises metals of known low toxicity, and preferably those that are essential to life and are widely prevalent in the environment.

A particular advantage of the composition for use in the present invention is that it provides an additive which catalyses the oxidation of soot within the trap thereby reducing the so-called 'light off temperature' and/or improves the combustion of diesel fuel.

Thus important advantages of the present invention include the cost-efficient preparation of a diesel fuel additive having high fuel solubility and stability, which when burned with the fuel: reduces the ignition temperature and/or enhances oxidation of resulting particulate matter caught within a trap, may render the particulate matter remaining in the exhaust gas more collectable on a trap and/or reduces the emission of soot, unburned hydrocarbons and partially oxidised hydrocarbons—when compared to that of a fuel burned without the additive preparation. In this context 'regeneration' is defined as the process of reducing the pressure drop across the filter trap through the oxidation of trapped material. This normally requires some external energy input. Such filter trap devices and their means of regeneration are well known to those familiar with the art and some examples are discussed in "Advanced techniques for thermal and catalytic diesel particulate trap regeneration", SAE International Congress (February 1985)

SAE Special Publication-42 343–59 (1992). However, use of the composition according to the present invention reduces or eliminates the need for an external energy intput.

Another important advantage of the present invention is that under many engine operating conditions as a result of the addition of the complex to the fuel, there is less particulate matter and less remaining particulate matter. Hence the trap takes longer to fill with particulate matter. The frequency at which traps must be regenerated is thus reduced. Furthermore, the need for energy from an external source to aid regeneration can be reduced or eliminated.

Thus important advantages of the present invention include the provision of a fuel additive that when burned with the fuel: reduces the emission of soot, unburned hydrocarbons and partially oxidised hydrocarbons; renders the particulate matter remaining in the exhaust gas more collectable on a trap; reduces the ignition temperature of the trapped material; enhances the oxidation of the trapped particulates—when compared to that of fuel burned without the additive preparation.

The burning of soot and other hydrocarbons from the surfaces of a trap following the combustion or pyrolysis of fuel comprising the composition of the present invention therefore provides a way to regenerate the filter and so prevent the unacceptable clogging of diesel particulate traps.

Also, the fuel additive of the present invention leads to reduced levels of combustion or pyrolysis ash. Thus, clogging of the trap from the additive residue is kept to a minimum.

Preferably for a 'deep bed' filter trap, such as one constructed from 3M Nextel™ fibre, the concentration of metal in the Group I and/or Group II metal complex in the fuel is 30 ppm or less.

Preferably, for a 'cracked wall' type filter trap, such as the Corning EX80™, the concentration of metal in the Group I and/or Group II metal complex in the fuel is 30 ppm or less.

Preferably, the organo-metallic complex is stable to hydrolysis.

Preferably, the organo-metallic complex comprises a Lewis base.

Preferably, the organo-metallic complex comprises a Lewis base and the organo-metallic complex is a metal complex of any one of the following organic compounds:

a) an aliphatic alcohol of the general formula $CH_3$—X—OH, where X signifies a $C_{1-8}$ alkyl group, or a compound of such an alcohol;

b) an aromatic alcohol of the general formula Ph—X—OH where Ph signifies a phenyl ring, X signifies a $C_{1-8}$ alkyl group;

c) an ortho, meta or para singly substituted phenol wherein the substituted group is a $C_{1-8}$ alkyl group;

d) an aliphatic carboxylic acid of the general formula $CH_3$—X—COOH, where X signifies a $C_{3-16}$ alkyl group, or an isomeric compound of such a carboxylic acid; or e) a 1-naphthoic acid, a 2-naphthoic acid, a phenyl acetic acid or a cinnamic acid.

In an alternative embodiment, preferably the organo-metallic complex is a metal complex of any one of the following organic compounds: a substituted aliphatic alcohol, a substituted or unsubstituted aliphatic higher alcohol (e.g. a diol), a substituted aromatic alcohol, a substituted phenol comprising at least two substituted groups, a substituted aliphatic carboxylic acid, a substituted or unsubstituted aliphatic higher carboxylic acid (e.g. a dicarboxylic acid) or a substituted or unsubstituted aromatic acid, or derivatives thereof, but not 1-naphthoic acid, 2-naphthoic acid, a phenyl acetic acid or a cinnamic acid.

Preferably, the organo-metallic complex is a metal complex of any one of the following organic compounds: a substituted aliphatic alcohol containing ether (eg —$OCH_2CH_2$—) or amino groups, a substituted or unsubstituted aliphatic higher alcohol (eg a diol) containing ether (eg —$OCH_2CH_2$) or amino groups, a substituted aromatic alcohol containing groups capable acting as Lewis base ligands (eg —$NR_2$ or —OR) and being in a position to form dative bonds to a metal bound to the alkoxy group, a substituted phenol comprising at least two substituted groups, a substituted phenol containing groups capable acting as Lewis base ligands (eg —$NR_2$ or —OR) and being in a position to form dative bonds to a metal bound to the phenol hydroxy group, an aliphatic carboxylic acid of the general formula $CH_3$—X—COOH where X signifies an alkyl group with 17 or more carbon atoms or is a $C_{3-16}$ alkenyl group or isomeric compounds of such, an aliphatic carboxylic acid $R^1R^2R^3CCOOH$ wherein $R^1$, $R^2$ and $R^3$ are independently selected from hydrogen, alkyl or alkenyl groups containing two or more carbon atoms but wherein no more than one R is hydrogen and excluding aliphatic carboxylic acids of formula $CH_3$—X—COOH where X signifies a $C_{3-16}$ alkyl or alkenyl group, a carboxylic acid $R^1R^2R^3CCOOH$ wherein at least one R is aryl or substituted aryl and the others may be H, alkyl or alkenyl groups, except where the carboxylic acid is phenyl acetic acid, a substituted or unsubstituted aliphatic higher carboxylic acid (eg a dicarboxylic acid) preferably an alkyl or alkenyl substituted succinic acid, the product of reaction of a metal hydroxide with a substituted or unsubstituted aliphatic or aromatic anhydride, preferably a succinic anhydride, or a β-diketone, substituted β-diketone or β-keto acid.

Preferably, the organo-metallic complex is a metal complex of a highly substituted phenol (e.g. di-(t.butyl) methylphenol).

Preferably, the organo-metallic complex is fuel soluble.

Preferably, the organometallic complex is soluble in a fuel-compatible solvent such that the organometallic complex is soluble to the extent of 10 wt %, preferably 25 wt % and most preferably 50 wt % or more in the solvent. Preferably some or all of the solvent may be a polybutene.

Preferably, the organo-metallic complex is of the formula $M(R)_m \cdot nL$ where M is the cation of an alkali metal or an alkaline earth metal, of valency m, not all metal cations (M) in the complex necessarily being the same; R is the residue of an organic compound RH, where R is an organic group containing an active hydrogen atom H replaceable by the metal M and attached to an O, S, P, N or C atom in the group R; n is a positive number indicating the number of donor ligand molecules forming a bond with the metal cation, but which can be zero; and L is a species capable of acting as a Lewis base.

Viewed from a further aspect the invention provides a process of regenerating a particulate trap use for entrapping particulates in an exhaust gas, the process comprising burning off the trapped particulates in and on the particulate trap; characterised in that at least some of the particulates comprise an organo-metallic complex of the formula $M(R),.nL$ or a compound derived from the combustion or pyrolysis of such a complex in fuel wherein M is the cation of an alkali metal, an alkaline earth metal, or a rare earth metal of valency m, not all metal cations (M) in the complex necessarily being the same; R is the residue of an organic compound RH, where R is an organic group containing an active hydrogen atom H replaceable by the metal M and attached to an O, S, P, N or C atom in the group R; in a positive number indicating the number of donor ligand molecules forming a bond with the metal cation, but which can be zero when R comprises L; and L is a species capable of acting as a Lewis base; further wherein the regeneration is capable of occurring at milder conditions (such as at a lower exhaust gas temperature) than when the particulates do not comprise either the organo-metallic complex or the combustion or pyrolysis products thereof.

Preferably, R and L are in the same molecule, in which case L is conveniently a functional group capable of acting as a Lewis base.

Preferably, the composition is dosed to the fuel at any stage in the fuel supply chain.

Preferably the composition is added to the fuel close to the engine or combustion systems, within the fuel storage system for the engine or combustor, at the refinery, distribution terminal or at any other stage in the fuel supply chain.

The present invention therefore relates to additives for liquid hydrocarbon fuel, and fuel compositions containing them.

The term "regenerating a particulate trap" means cleaning the particulate trap so that it contains minimal or no particulates. The usual regeneration process includes burning off the trapped particulates in and on the particulate trap. Regeneration of the trap is accompanied by a lowering of the resistance to flow of (exhaust) gas through the trap; it is detected by a decrease in the pressure drop across the trap.

The term "fuel" includes any hydrocarbon that can be used to generate power or heat. The term also covers fuel containing other additives such as dyes, cetane improvers, rust inhibitors, antistatic agents, gum inhibitors, metal deactivators, de-emulsifiers, upper cylinder lubricants, and anti-icing agents. Preferably, the term covers diesel fuel.

The term "diesel fuel" means a distillate hydrocarbon fuel or for compression ignition internal combustion engines meeting the standards set by BS 2869 Parts 1 and 2 as well as fuels in which hydrocarbons constitute a major component and alternative fuels such as rape seed oil and rape oil methyl ester.

The combustion of the fuel can occur in, for example, an engine such as a diesel engine, or any other suitable combustion system. Examples of other suitable combustion systems include recirculation engine systems, domestic burners and industrial burners.

The term "species capable of acting as a Lewis base" includes any atom or molecule that has one or more available electron pairs in accordance with the Lewis acid-base theory.

The term "induces acceptable spontaneous trap regeneration according to the Test Protocol presented in the Examples" means that the composition is of high effectiveness, when the composition is tested according to the Test Protocol presented in the Examples (see later).

The present invention therefore relates to additives for liquid hydrocarbon fuels, and fuel compositions containing them. In particular the invention relates to additives effective in reducing the levels of particulate and/or unburned hydrocarbon in the exhaust. More specifically the invention relates to additives effective to reduce the particulate and/or unburned hydrocarbon content of exhaust gas emissions from diesel engines. Furthermore the invention relates to fuel additive preparations that lower the ignition temperature and enhance the combustion of trapped particulate matter. Especially, the invention relates to fuel additive preparations that lower the ignition temperature and enhance the combustion of trapped particulate matter from diesel engines. The present invention therefore provides additives for fuel that give an overall reduction in the environmental damage resulting from the combustion of that fuel.

In addition to the advantages outlined above, it is to be noted that when traps are used with the compositions of the present invention the need for an external energy input for regeneration is greatly reduced or in some instances eliminated. Thus, the fuel additive of the present invention can be effective in reducing engine out emissions and especially as a combustion catalyst aiding the oxidation of trapped particles. The additive therefore provides for simpler, safer and less costly traps by enabling less frequent, less intense or less energetic regeneration, whether the heat required for regeneration is provided by the exhaust gas or through some external mechanism.

In a preferred embodiment, the compositions of the present invention yield water soluble products after the combustion thereof. In this regard, there is an advantage because if the additive metals provide ultimate products that are readily water soluble so recycle of particulate traps becomes simpler and less costly.

In a preferred embodiment the composition of the present invention is fuel-soluble or fuel miscible. With these aspects, the present invention provides concentrates of the composition (additive) in a solvent fully compatible with fuels, especially diesel fuels, such that blending of fuel and additive may be more easily and readily carried out. This serves to reduce the complexity and cost of any on-board dosing device.

In a preferred embodiment the composition (additive) of the present invention is at least resistant and preferably totally inert towards water leaching. With this aspect, the present invention provides a composition that is very compatibile with fuel handling, storage and delivery thereof. In particular, diesel fuel often encounters water, especially during delivery to the point of sale, and so such compositions would be of enormous benefit for this type of fuel.

In one aspect of the present invention, the alkali metal and alkaline earth metal complexes of the present invention have the general formula where M is the cation of an alkali metal or an alkaline earth metal of valence m, R is the residue of an organic compound of formula RH where H represents an active hydrogen atom reactive with the metal M and attached either to a hetero atom selected from O, S and N in the organic group R, or to a carbon atom, that hetero or carbon atom being situated in the organic group R close to an electron withdrawing group, e.g. a hetero atom or group consisting of or containing O, S or N, or aromatic: ring, e.g. phenyl, n is a number indicating the number of organic electron donor molecules (Lewis bases) forming dative bonds with the metal cation in the complex, usually up to five in number, more usually an integer from 1 to 4, and L is one or more organic electron donor ligand (Lewis base). R may comprise one or more functional groups capable of acting as an organic electron donor ligand.

In a more detailed aspect, the Lewis base metallo-organic co-ordination complexes used in accordance with the present invention contain the residue of an organic molecule RH which contains an active hydrogen atom H which is replaceable with a metal cation. In the organic compound RH the active hydrogen atom will be attached to a hetero atom (O, S, or N) or to a carbon atom close to an electron withdrawing group. The electron withdrawing group may be a hetero atom or group consisting of or containing O, S, or N, e.g. a carbonyl (>C=O), thione (>C=S) or imide (>C=NH) group, or an aromatic group, e.g. phenyl. When the electron withdrawing group is a hetero atom or group, the hetero atom or group may be situated in either an aliphatic or alicyclic group, which, when the active hydrogen group is an NH group, may or may not, but usually will contain that group as part of a heterocyclic ring.

Suitable complexes are derived from a β-diketone of the formula $$R^1C(O)CH_2C(O)R^2$$

where $R^1$ or $R^2$ is $C_1$–$C_5$, alkyl or substituted alkyl, e.g. halo-, amino-, alkoxy- or hydroxyalkyl-, $C_3$–$C_6$ cycloalkyl, benzyl, phenyl or $C_1$–$C_5$ alkylphenyl, e.g. tolyl, xylyl, etc., and where $R^1$ may be the same as or may be different to $R^2$.

Suitable β-diketones include: hexafluoroacetylacetone: $CF_3C(O)CH_2C(O)CF_3$ (HFA); 2,2,6,6-tetramethylheptane-3,5-dione: $(CH_3)_3CC(O)CH_2C(O)C(CH_3)_3$.

If the active hydrogen atom is attached to oxygen in the organic compound RH, then suitable compounds include $C_{6-30}$ phenolic compounds, preferably substituted phenols containing from 1–3 substituents selected from alkyl, alkylaminoalkyl, and $C_{1-8}$ alkoxy groups, e.g. cresols, guiacols, di-t-butylcresols, dimethylaminomethylenecresol. The substituted phenols are particularly preferred. Especially preferred such metal complexes are those derived from reaction of a metal hydroxide or other alkali or alkaline earth metal source with an alkyl or alkenyl substituted succinic anhydride or the hydrolysis product. Typically such anhydrides are those prepared by reaction of oligomerised isobutenes with maleic anhydride. A wide variety of such materials and a range of techniques for their preparation are known to those skilled in the art. In general, a high molecular weight poly(isobutene) substituent provides the resulting complex with good hydrocarbon solubility at the cost of lower metal content. We have found the alkenyl substituted succinic anhydride derived from the thermal reaction of BP Napvis X-10™ with maleic anhydride to give a good compromise between hydrocarbon solubility and metal content. It is considered that in such compounds one carboxylic acid group is deprotonated and bound in salt-like fashion to metal ion and the second carboxylic acid group is protonated and bound to metal ion as a Lewis base.

If the active hydrogen is attached to a nitrogen atom in the organic compound RH, then suitable compounds are heterocyclic compounds of up to 20 carbon atoms containing a —C(Y)—NH— group as part of the heterocycle, Y being either O, S or =NH. Suitable compounds are succinimide, 2-mercaptobenzoxazole, 2-mercapto-pyrimidine, 2-mercaptothiazoline, 2-mercaptobenzimidazole, 2-oxobenzoxazole.

In more detail, L can be any suitable organic electron donor molecule (Lewis base), the preferred ones being hexamethylphosphoramide (HMPA), tetramethylethylenediamine (TMEDA), pentamethyldiethylenetriamine, dimethylpropyleneurea (DMPU), dimethylimidazolidinone (DMI), dimethylcarbonate (DMC), dimethylsulphoxide (DMSO), dimethylformamide (DMF). Other possible ligands are diethylether ($Et_2O$), 1,2-dimethoxyethane (monoglyme), bis (2-methoxyethyl)ether (diglyme), dioxane, tetrahydrofuran. Where R comprises L, L is conveniently a functional group capable of acting as a Lewis base donor, preferred ones being dimethylaminomethyl (—$CH_2N(CH_3)_2$), ethyleneoxy (—$OCH_2CH_2O$—), ethyleneamine (—$N(R)CH_2CH_2N$(R)—), carboxyl(—$CO_2H$) and ester(—$CO_2CH_2$—). It is to be understood that these listings are by no means exhaustive and other suitable organic donor ligands or functional groups (Lewis bases) may be used.

The metal complex will usually contain 1–4 ligand molecules to ensure oil solubility, i.e. the value of n will usually be 1, 2, 3, or 4. Where R comprises L, n can be and often is zero.

The Lewis base metallo-organic salt complexes used in the invention can be obtained by reacting a source of the metal M, e.g. the elemental metal, a metal alkyl or hydride, an oxide or a hydroxide, with the organic compound RH in a hydrocarbon, preferably an aromatic hydrocarbon solvent such as toluene, containing the ligand in a stoichiometric amount or in an excess amount.

Whilst any of the alkali (Group I: Atomic Nos. 3, 11, 19, 37, 55) and alkaline earth (Group II: Atomic Nos. 4, 12, 20, 38, 56) may be used as the metal (or metals) M, preferred are the donor ligand complexes of sodium, potassium, strontium or calcium. The metal hydroxide will typically be the preferred source of the metal, on economic grounds.

Whilst the organometallic compounds described may be added directly to the fuel, either external to the vehicle or by using an on board dosing system, they will preferably first be formulated as a fuel additive composition or concentrate containing the substance, or mixtures thereof possibly along with other additives, such as detergents, anti foams, dyes, cetane improvers, corrosion inhibitors, gum inhibitors, metal deactivators, de-emulsifiers, upper cylinder lubricants, anti-icing agents, etc., in an organic carrier miscible with the fuel.

Without wishing to be bound by theory it is believed that the compositions of the present invention are effective in view of their lower molecular weight and/or lower molecular size than the more commonly used overbased materials which are micellar in nature. In this regard, it is believed that a more 'molecular' species will be more evenly distributed throughout the fuel and so show greater efficiency. In addition, it is believed that charge transfer type mechanisms may play a part. In this regard, the metal may act as charge transfer agent, causing soot particles to acquire charge. The tendency of like charges to repel then reduces agglomeration of soot particles. Thus changes in morphology would be responsible for ready oxidation of the particle. In addition is is believed that the generation of hydroxyl radicals are to play a part. In this regard, the metals (group 2 in particular) may catalyse the generation of OH radicals which are known to be important in flame propagation in fuel rich flames.

In addition, it is believed that the formation of combustion initiators may play a part. In this regard, the metal may form a peroxide (sodium is known to do this on combustion in air) which is particularly reactive towards carbonaceous soot and so initiates reaction at lower temperatures.

BRIEF DESCRIPTION OF THE DRAWINGS

The test protocol that follows employed an exhaust gas filter or trap shown in the attached drawings in which.

The present invention will now be described only by way of the following non-limiting examples.

In the following Examples reference shall be made to a Test Protocol which is outlined later on. This Test Protocol provides an easy means to determine if a fuel additive would be acceptable as a composition according to the present invention. A composition is acceptable if the composition is of high effectiveness when the composition is tested according to this Test Protocol. It is to be noted that the claims are not limited to the compositions when only used in this Test Protocol.

TEST PROTOCOL

The tests were carried out in a Renault truck on a rolling road dynamometer, detailed specifications are given below.

Figure 1:
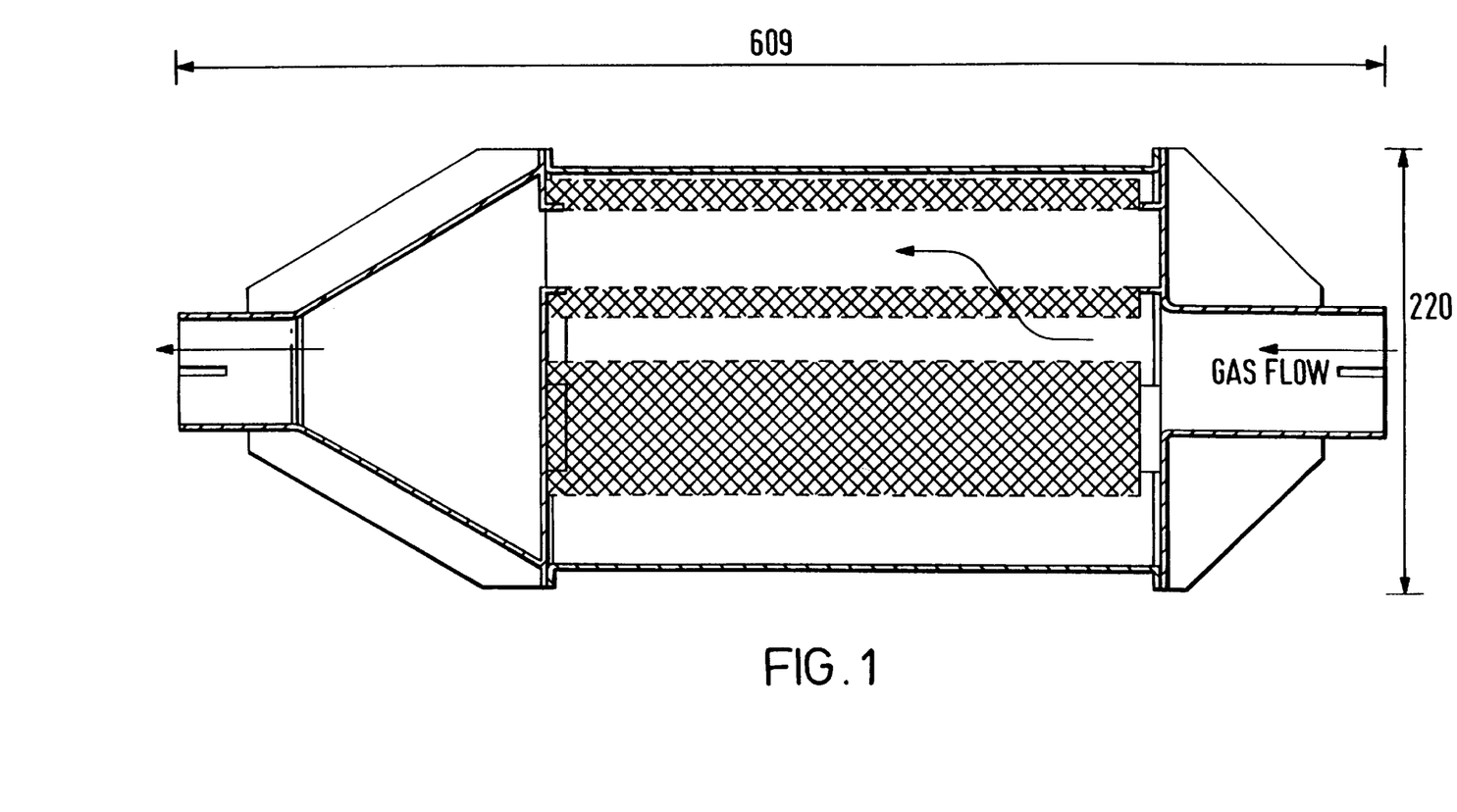
FIG. 1 is a cross sectional view of an exhaust gas filter trap containing radial flow filter cartridges used in parallel.
Figure 2:
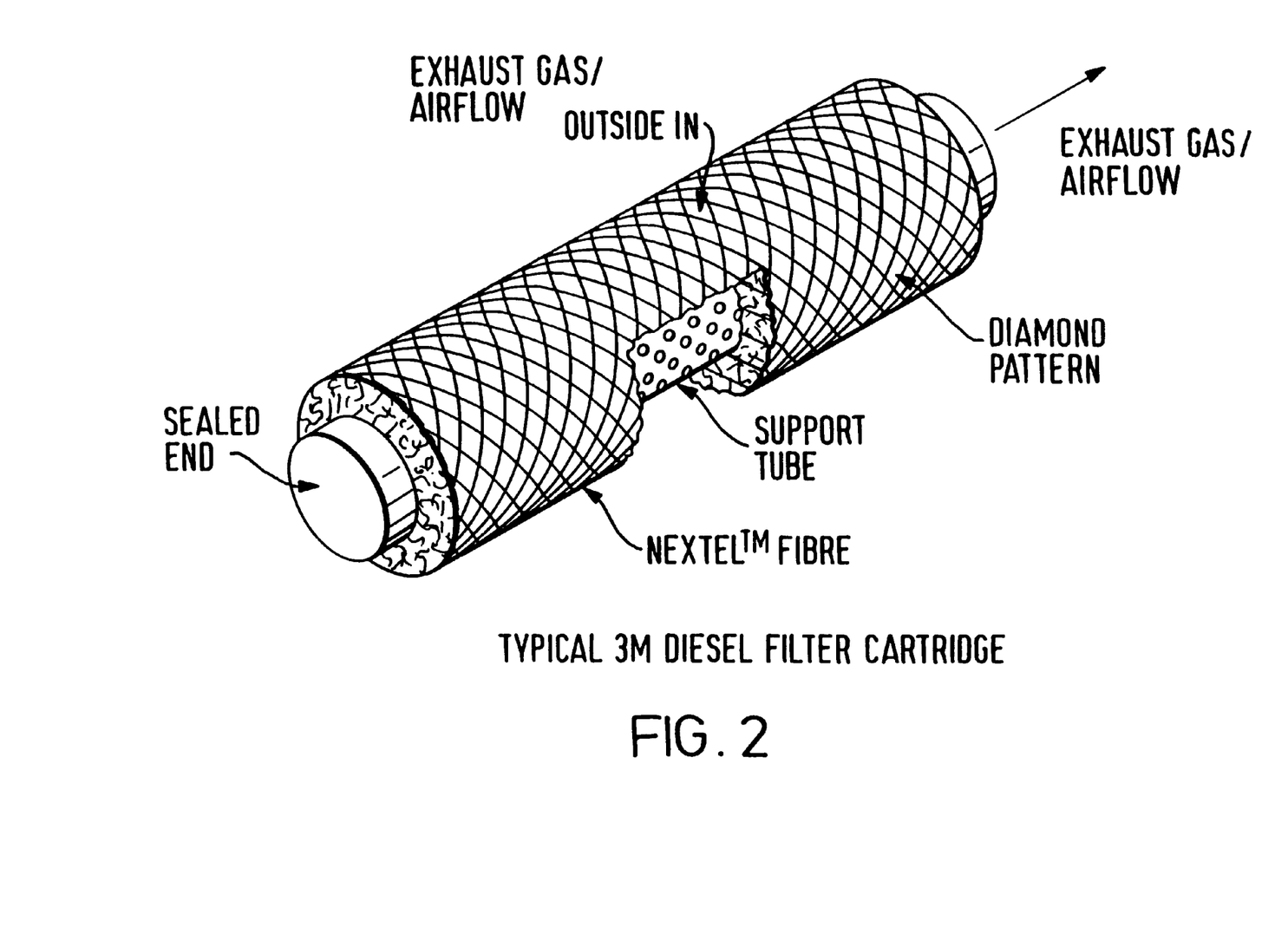
FIG. 2 is a perspective view of a radial flow filter cartridge of FIG. 1 partially broken away showing a collandered steel tube spiral wound with fiber.
Figure 3:
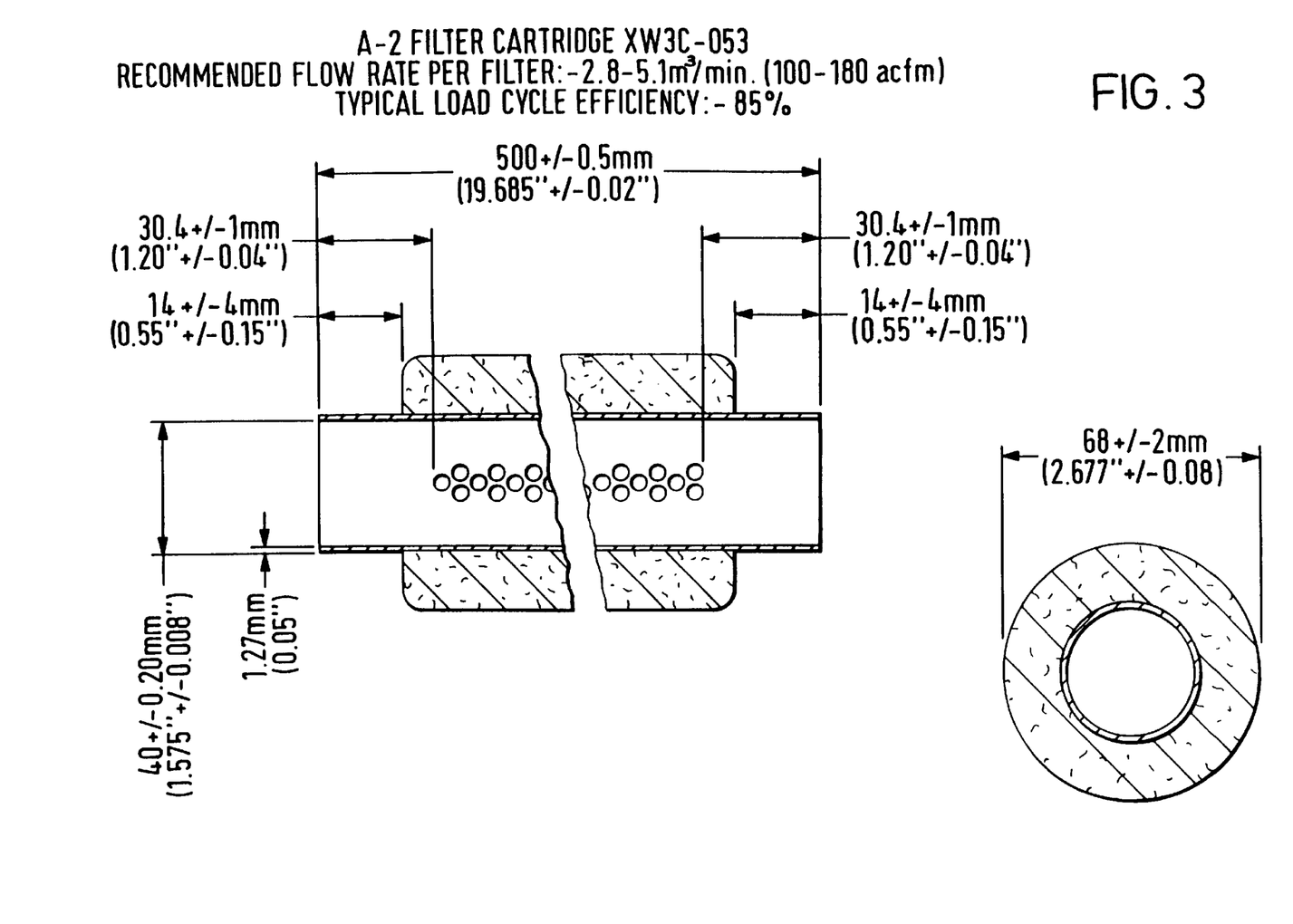
FIG. 3 is a longitudinal and cross-sectional view of the radial flow filter cartridge of FIG. 2.

MAKE: Renault 50 Series S35 truck
FIRST REGISTERED: 14th August 1990
UNLADEN WEIGHT: 2483 kg
MAX. LADEN WEIGHT: 3500 kg
ENGINE: PERKINS PHASER 90, normally aspirated, 4
  Cylinder in line water cooled, 16.5:1 Compression ratio
ENGINE CAPACITY: 3990 cm$^3$
RATED POWER: 62 kW at 2800 rpm
BORE: 100 mm
STROKE: 127 mm
FUEL PUMP: Bosch type EPVE direct injection design
TRANSMISSION: Rear wheel drive The vehicle was additionally equipped with an exhaust gas filter or trap. The filter trap comprised radial flow filter cartridges XW3C-053 (from 3M Corporation) employed in parallel—as shown in FIG. 1. The cartridges were arranged at the corners of an equilateral triangle—as shown in FIG. 1. Nextel (Trade mark of 3M Corporation) fibre is supplied wound in spiral fashion about a collandered 50×4 cm steel tube—as shown in FIGS. 2 and 3. The cartridges were used as supplied. The distance from the engine manifold to the entrance to the trap was about one meter. The exhaust pipe and trap were lagged with insulating material.

Additised fuel was prepared by dissolving the required amounts of additive in one liter of base diesel fuel, then diluting in the base fuel until the fuel finally contained an additional 5 ppm m/m of the metal above background level. Base fuel used was BPD26, as specified below.

| DIESEL ANALYSIS | |
|---|---|
| DESCRIPTION OF SAMPLE | BPD26 |
| SAMPLE NO. | 944929 |
| DENSITY @ 15° C. | 0.8415 |
| VISCOSITY @ 20° C. | |
| VISCOSITY @ 40° C. | 3.060 |
| CLOUD POINT ° C. | −5 |
| CFPP ° C. | −14 |
| POUR POINT ° C. | −15 |
| FLASH POINT ° C. | 70.5 |
| SULPHUR % WT. | 0.13 |
| Initial boiling point @ ° C. | 185.5 |
| 5% VOL. @ ° C. | 209.8 |
| 10% VOL. @ ° C. | 224 |
| 20% VOL. @ ° C. | 246.1 |
| 30% VOL. @ ° C. | 260.8 |
| 40% VOL. @ ° C. | 271.5 |
| 50% VOL. @ ° C. | 280.6 |
| 65% VOL. @ ° C. | 294.8 |
| 70% VOL. @ ° C. | 299.6 |
| 85% VOL. @ ° C. | 319.8 |
| 90% VOL. @ ° C. | 330.1 |
| 95% VOL. @ ° C. | 347.0 |
| FBP @ ° C. | 360.4 |
| % VOL. RECOVERY | 98.1 |
| % VOL. RESIDUE | 1.8 |
| % VOL. LOSS | 0.1 |
| C.C.I. (IP41) | 54.5 |
| C.C.I. (IP380) | 53.2 |

| -continued | |
|---|---|
| DIESEL ANALYSIS | |
| CETANE IMPROVER - % | NIL |
| CETANE NUMBER | 54.2 |

The test was in two parts; A soot collection or trap blocking phase, and A forced filter regeneration or burn off stage.

The soot collection phase consisted of running the truck at steady speed and level road drag power for the unladen vehicle such that for a clean trap the exhaust gas temperature was about 195° C. at the inlet to the trap. This driving condition was continued until the soot loading caused the pressure drop across the filter to reach a value of 200 mbar (150 mbar was used during some early runs).

The forced filter regeneration stage entailed increasing the exhaust gas temperature until the soot collected on the trap ignited and burnt off. This was achieved by increasing vehicle speed to about 90 km/hr and dynamometer load towards 300 Nm at 5 Nm/min. This was done at the conclusion of each sooting phase i.e. when the pressure drop reached 200 mbar.

Ignition of the soot was inferred by observing a decrease of pressure drop across the filter. 'Forced' ignition occurred at exhaust gas temperatures of >300° C. 'Spontaneous' burnoff or ignition is that which ocurs at or below about 200° C.

Each sequence of runs using a given additised fuel was preceded by a minimum of three sequences of trap blocking and soot burn off or regeneration, as described above. For this base untreated fuel was used. Typically, the exhaust gas temperature range 500 to 550° C. were reached. The time to load the trap decreased with successive runs using base fuel (reference fuel data).

Runs using additised fuel were characterised in that spontaneous soot ignition and prolonged soot collection phases to reach the 'blocked' condition were observed. The degree to which these phenomena were observed varied between one additised fuel and another.

Additives were characterised as follows.

1. An additive was considered to be of "high effectiveness" if two or fewer sequences of filter sooting and regeneration were required before a period of prolonged soot collection running, i.e. greater than 12 hours, was achieved without the need for a forced regeneration; typically ten or more spontaneous soot ignitions were observed when this was achieved.
2. An additive was considered to be of "low effectiveness" if the above conditions regarding prolonged soot collection running and/or number of forced regenerations required were not met, but nevertheless some spontaneous ignitions were observed.
3. An additive was considered "ineffective" if after five sequences of soot collection running and forced burnoff no episodes of spontaneous ignition or prolonged running, i.e. greater than six hours, had been observed.

EXAMPLE 1

Preparation of 1,3-dimethylimidazolidinone Adduct of Sodium 2,2,6,6-tetramethylheptane-3,5-dionate: [Na(TMHD).DMI]

A round bottom flask was charged under nitrogen with sodium hydride (NaH, 4.8 g, 200 mmol), dry toluene (100 cm$^3$) and dimethylimidazolidinone (23.8 cm$^3$, 22.8 g, 200 mmol). 2,2,6,6-tetramethylheptane-3,5-dione (HTMHD, 43 cm$^3$, 37.97 g, 206 mmol) was then added dropwise by syringe against nitrogen flush. After the addition of a few drops an effervesence was noted. The solution was stirred and gently warmed (oil bath, 60° C.) during one hour before filtration. A 90% plus yield of NaTMHD.DMI crystals grew on refrigeration.

Melting point 70–72° C., C/H/N found versus (calculated) wt %, C 60.09 (60.00), H 9.14 (9.06) and N 8.67 (8.85), $^1$H nmr in C$_6$D$_6$ shifts rel. to TMS 5.873 ppm (s, H, COCH̲CO), 2.609 (s, 6H, NCH̲$_3$), 2.570 (s, 4H, CH̲$_2$CH̲$_2$) and 1.396 (s, 18H, C(CH̲$_3$)$_3$).

EXAMPLE 2

Preparation of Sodium Salt of Poly(isobutenyl) Succinic Acid, Approx. 1,000 Molecular Weight [Na(PIBSA$_{1000}$)]

A suspension of powdered solid sodium hydroxide (8.04 g, 200 mmol) in a solution of poly(isobutenyl) succinic anhydride (PIBSA, 198.8 g, 200 mmol) in dry toluene (995 cm$^3$) was allowed to stir at ambient temperature during several days. The solids dissolved to yield a clear solution of 1000 molecular weight poly(isobutenyl)succinic acid, monosodium salt.

EXAMPLE 3

Preparation of Dimethylcarbonate Adduct of the Sodium Salt of 2,6-ditertiarybutyl-4-methyl Phenol: [(NaBHT)$_2$.3DMC]

A solution of 2,6-ditertiarybutyl-4-methyl phenol (butylated hydroxy toluene, BHT, 21.8 g, 100 mmol) in dry toluene 100 cm$^3$) is added to a suspension of sodium hydride (2.4 g, 100 mmol) in dry toluene (100 cm$^3$) and dimethyl carbonate (12.64 cm$^3$, 13.51 g, 1.5 equiv) under inert atmosphere. Precipitation of white material accompanied the evolution of hydrogen gas and heat. After completion of the addition the reaction mixture was stirred at ambient temperature during some 60 minutes. The solids were isolated by fitration and dried under vacuum.

C/H/N found versus (calculated) wt %, C 62.40 (62.07) and H 8.28 (8.49).

EXAMPLE 4

Preparation of the Dimethylimidazolidinone Adduct of the Strontium Salt of 2,2,6,6-tetramethylheptane-3,5-dione;[Sr(TMHD)$_2$.3DMI]

HTMHD (21 cm$^3$, 18.54 g, 100.6 mmol) was added under inert atmosphere to a solution of dimethylimidazolidinone (30 cm$^3$, 32.32 g, 283 mmol) in dry toluene (20 cm$^3$) containing a piece (6 g) of strontium metal. An immediate effervesence was noted. The contents of the flask were stirred and warmed (80° C., oil bath) overnight yielding a yellowy solution and some colourless solids. The solids were dissolved by the addition of further toluene (30 cm$^3$) and unreacted Sr removed by filtration. Refrigeration yielded large block-shaped crystals of [Sr(TMHD)$_2$.3DMI] in 90% yield.

EXAMPLE 5

Preparation of the Stontrium Salt of Molecular Weight 1,000 Poly(isobutenyl) Succinic Anhydride [Sr (PIBSA$_{1000}$)$_2$]

Poly (isobutenyl) succinic anhydride, 1,000 molecular weight, (69.48 g, 69 mmol) was weighed into a round-bottom flask. Dry toluene (347 cm$^3$) was added. The mixture was heated and stirred to form a homogenous solution. Strontium hydroxide octahydrate (6.90 g 26 mmol) was then added cautiously. Some frothing accompanied the addition. The mixture was refluxed during one hour then left to stir overnight. A Dean-Stark aparatus was then used to remove 3.8 cm$^3$ of water. The resulting slightly turbid solution was filtered, 0.7 g of solids were recovered. A final solution concentration of 0.56 wt % Sr as Sr(PIBSA$_{1000}$)$_2$ was achieved.

EXAMPLE 6

Preparation of Dimethylimidazolidinone Adduct of Calcium Bis 2,2,6,6-tetramethylheptane-3,5-dionate, [Ca(TMHD)$_2$.2DMI].

Calcium hydride (0.42 g, 10 mmol) suspension in toluene (20 cm$^3$) in the presence of two equivalents of dimethylimidazolidinone (2.2 cm$^3$, 20 mmol) is allowed to react with four equivalents of 2,2,6,6-tetramethylheptane-3,5-dione (40 mmol, 8.4 cm$^3$). After the initial exotherm dies down the mixture is stirred and gently warmed to yield a clear solution. The solution is filtered, reduced in volume until crystals begin to appear, then heated to redissolve the crystals. Recrystallisation is then found on refrigeration.

EXAMPLE 7

Preparation of the 1,3-dimethylimidazolidinone (DMI) Adduct of Potassium 2,2,6,6-tetramethyl-3,5-heptanedionate: [{K(TMHD)}$_2$.DMI]

Potassium hydride (KH, 0.90 g, 22.5 mmol) was washed of mineral oil, dried and placed in a Schlenk tube. Hexane was then added followed by DMI (7 ml, 64.22 mmol). Some effervescence occurred, implying reaction or dissolution, and a green coloration was apparent. TMHD (4.4 ml, 21.05 mmol) was then added slowly, as a very vigorous reaction takes place. After about fifteen minutes the reaction subsided and an oil settled out of solution. The two-phase liquid was cooled in an ice-box (to –10° C.) and a solid crystalline mass formed from the oil part over about half an hour.

The crystalline solids were washed with hexane, isolated and determined to be a dimethylimidizolidinone adduct of potassium 2,2,6,6-tetramethylheptane-3,5-dione: [{K (TMHD)}$_2$.DMI] Yield 1.7 g, 16% first batch based on a 1:2 ligand:donor ratio Formula: K[(CH$_3$)$_3$C(—O)CH$_2$C(=O)C(CH$_3$)$_3$].O=CN (CH$_3$)CH$_2$CH$_2$N(CH$_3$) , Mw 450.678 m.p. 64–68° C.

EXAMPLE 8

Dimethylimidazolidinone Adduct of Potassium 2,6-ditertiarybutyl-4-methyl Phenol, [K(BHT).2DMI]

The method of example 4 is used, with the appropriate change in Lewis base:metal ratio. The adduct is sufficiently soluble in toluene to permit recrystallisation. The microcrystals obtained have melting point 92–96° C.

EXAMPLE 9

Dimethylimidazolidinone Adduct of Sodium 2,6-ditertiarybutyl-4-methyl Phenol, [Na(BHT).3DMI]

The method of example 4 is used, with the appropriate change in Lewis base:metal ratio. The adduct is sufficiently soluble in toluene to permit recrystallisation. The crystals obtained have melting point 96–98° C.

EXAMPLE 10

Dimethylimidazolidinone Adduct of Sodium 2-methoxy Phenol, [Na(TMP).DMI]

The method of example 4 is used, with the appropriate change in Lewis base:metal ratio. The adduct is sufficiently soluble in toluene to permit recrystallisation. The crystals obtained have melting point 87–89° C.

EXAMPLE 11

Dimethylimidazolidinone Adduct of Strontium Bis 2,4,6-trimethylphenol, [{Sr(TMP)$_2$}$_2$.5DMI]

The method of example 4 is used, with the appropriate change in Lewis base and phenol:metal ratio. The adduct is sufficiently soluble in toluene to permit recrystallisation. The fine needle-like crystals obtained have melting point 244° C.

EXAMPLE 12

Preparation of the Sodium Salt of Molecular Weight 420 Poly(isobutenyl)succinic Anhydride A thermostatted 'Soverel'™ reactor was charged with BP Hyvis XD-35™ poly(isobutene) (665.79 g, no. av. mol. wt. 320, 2.08 mol) and maleic anhydride (411.79 g, 4.2 mol, 2.02 equivalents). The contents were heated to 200° C. with oil circulated through the jacket by an external oil bath and strongly stirred during 8 hours. A viscous, dark brown solution formed. The unreacted maleic anhydride was removed under vacuum, along with some of the unreacted poly(isobutene). A material analysing at 11.2 wt % poly (isobutene) was recovered.

A sample of the material prepared above (535.78 g, theoretical 1.125 moles PIBSA$_{420}$) was charged to a flat-bottomed glass vessel fitted with turbine agitator, thermo-couple well and charging port. The vessel was further charged with Solvesso 150™ (502.26 g). The contents were warmed to 82° C. via an external oil bath and stirred until homogenous. Beaded sodium hydroxide (46.03 g, 1.15 moles) was then charged. The resulting suspension of white 1 mm beads in brown solution was stirred overnight at 78° C. Material (1066.19 g) containing 2.13 wt % sodium as 420 molecular weight poly(isobutenyl)succinic acid, monosodium salt, was obtained.

EXAMPLE 13

Preparation of No. Average Molecular Weight 420 Poly(isobutylene) Succinic Anhydride-PIBSA$_{420}$ A reactor was charged with BP-Hyvis XD-35™ poly (isobutylene) (12.906 kg, 40.33 mol) and heated to 100° C. with stirring before adding maleic anhydride (5.966 kg, 60.88 mol). The temperature of the oil bath supplying the reactor jacket was set to 220° C., the internal reactor temperature reached 185° C. after three hours. This was taken as the start of the reaction time. The oil bath temperature was lowered to 212° C. and the reaction mix stirred during some 30 hours. At the end of this period a vacuum was applied and the excess amleic anhydride distilled out. After 15 hours under vacuum, residual maleic anhydride content was 0.0194 wt % and residual PIB 19.9 wt %. Some 13.888 kg of brown, viscous material was recovered.

EXAMPLE 14

Preparation of Strontium Salt of PIBSA$_{420}$

A reactor was charged with material prepared in Example 13 (555.81 g, 445.99 g, 1.06 mol PIBSA$_{420}$, 109.82 g, 343 mmol PIB$_{320}$) and Solvesso 150™ (346.46 g). This mixture was stirred and heated until homogenous. Strontium hydroxide octahydrate (140.43 g, 0.53 mol) was then added and heated to 50° C. overnight. Water (40.62 g), was removed by heating the solution to 120° C. Product contained 5.36 wt % Sr as Sr(PIBSA$_{420}$)$_2$.

EXAMPLE 15

Preparation of Potassium Salt of PIBSA$_{420}$

An oil-jacketed reactor was charged with material prepared in Example 13 (440.78 g, 0.85 mol PIBSA420), and Solvesso 150™ (462.53 g). The contents were warmed to 50° C. and stirred until homogenous. KOH flake (47.88 g, 0.77 mol if 10% H$_2$O) was then added with stirring and the resulting suspension left to stir overnight. The solids dissolved and FTIR analysis showed an absence of the 1863 cm$^{-1}$ absorption due to the PIBSA. The solution contained 3.33 wt % K as K(PIBSA$_{420}$).

EXAMPLE 16

Preparation of No. Average Molecular Weight 360 Poly(isobutylene) Succinic Anhydride (PIBSA$_{360}$)

A number average molecular weight 260 poly (isobutylene) (PIB$_{260}$, BP-Napvis X10™, 586.2 g, 2.257 moles) was charged to a one liter oil-jacketed reaction vessel. The vessel was further charged with maleic anhydride (442.71 g, 4.52 moles). The mixture was heated to 200° C. and stirred during 24 hours. At the end of this period, the maleic anhydride was removed by vacuum distillation.

A dark brown, viscous oil was recovered, this analysed as PIBSA$_{360}$ containing 8.1% m/m PIB$_{260}$.

EXAMPLE 17

Preparation of Sodium Salt of No. Average Molecular Weight 360 Poly(isobutylene) Succinic Acid-Na(PIBSA$_{360}$)

A reactor was charged with a sample of poly(isobutylene) succinic anhydride prepared as above (412.91 g, 392.26 g PIBSA360, 1.096 moles, 20.65 g PIB260). The vessel was further charged with Solvesso 150™ (526.19 g) and the liquids heated and stirred to form a homogenous deep brown solution. Sodium hydroxide as dry pellets (43.84 g, 1.096 mol) was then added. The resulting suspension was stirred overnight at 70° C. FTIR indicated complete consumtion of the PIBSA and formation of carboxylic acid and carboxylic acid salt. The solution was decanted and analysed as containing 2.35 wt % Na as Na(PIBSA$_{360}$).

EXAMPLE 18

Preparation of Strontium Salt of No. Average Molecular Weight 360 Poly(isobutylene) Succinic Acid-Sr(PIBSA$_{360}$)$_2$ A jacketed reactor was charged with poly(isobutylene) succininc anhydride prepared as in Example 16 (468.43 g, 451.10 g, 1.26 moles PIBSA, 37.33 g PIB) and Solvesso 150™ (568.90 g), the two were heated to 50° C. and stirred to yield a homogeneous solution. Sr(OH)$_2$.8H$_2$O (170.79 g, 0.64 mol) was then added. The resulting suspension was then stirred until the solids had dissolved. No attempt was made to separate the water.

Comparative Example 1: Preparation of Sodium Salt of Tertiary Amyl Alcohol, [NaOtAm], as a 20 wt % Solution in Xylene Sodium stored under mineral oil was cleaned of the outer layer of oxide/hydroxide then cut into 1 cm cubes under toluene. The pieces were shaken dry in air, then charged (50.27 g) to a tared electrically heated vessel equipped with nitrogen flush and carrot valve. The sodium was melted out then added via the valve and under inert atmosphere to a round bottom flask containing dry mixed xylenes (400 g, 465 cm$^3$) 38.45 g (1.67 moles) was found to have been so transferred. Further dry mixed xylenes (175 cm$^3$, 152 g) were then added to the reaction flask. The heated vessel was then replaced with a reflux condenser. The reaction flask was additionally fitted with a pressure equalising dropping funnel. The flask was heated in an oil bath until the sodium became molten. Rapid stirring yielded a silvery suspension. The dropping funnel was charged with tertiary amyl alcohol (182 cm$^3$, 155 g). The alcohol was added with caution over about thirty minutes. A moderate evolution of hydrogen was noted. The reaction was heated with stirring during some 18 hours during which time a clear, colourless solution resulted. The solution was tranferred through a cannula to dry bottles which were then firmly sealed against ingress of oxygen or moisture.

Comparative Example 2: Preparation of Sodium Dodecylbenzene Sulphonate Overbased Eight Times with Sodium Carbonate A stable dispersion in mineral oil of overbased sulphonic acid was prepared as described in GB 1481553, save that poly(isobutenyl)succinic anhydride of average molecular weight 1000 (142 g) versus 560 (71 g) was used.

Comparative Example 3: Sodium Tert-butoxide in Propan-2-ol

All aparatus was dried in an oven at 120° C. and cooled either under a flow of nitrogen or during admission to the dry box. A round-bottom flask was charged in the dry box with sodium tert-butoxide powder (20.126 g, Aldrich, fresh bottle). The flask was stoppered and removed from the dry box and fitted with nitrogen flush, overhead stirrer and pressure-equalised dropping funnel. The dropping funnel was then charged with anhydrous propan-2-ol (820.94 g, Aldrich) by cannula from the 'Sure-Seal'™ bottle. The alcohol was added slowly with stirring and gentle warming to the alkoxide. A pale green, clear solution resulted.

Engine out Emissions Reduction

The engine used for the testing was a single cylinder version of the Perkins 4-236 normally aspirated direct injection engine. This engine is elsewhere referred to as a Perkins 236-S engine. The engine was arranged so that only the cylinder nearest the flywheel was operative. The fuel pump was a Simms plunger unit to be operating to supply the firing cylinder. The fuel system was arranged to allow easy changing of fuel, without contamination from one fuel to another. Fuel was blended by standard methods to contain 10 ppm m/m of additive metal.

The engine was connected to drive a Heenan & Froude eddy current dynamometer controlled by a test bed control system. The speed of the engine and dynamometer could be measured by a magnetic pick up and a 60 toothed wheel arrangement. A load cell was arranged to indicate the torque absorbed by the dynamometer.

The inlet air to the engine was conditioned by a special purpose unit to dehumidify and ensure the air supply was held at constant temperature.

The test bed was equipped with a computer based data logging system.

Smoke measurement was carried out by a Celesco model 107 obscuration type smoke meter having a 100 mm light path. A Bosch smoke meter drawing one liter of exhaust gas through a standard filter paper was also used. A Bosch envigilator unit was used to grade the filter paper blackening.

Unburnt hydrocarbons were determined by sampling exhaust gas through a heated line to a Beckman Flame Ionisation Detector (FID model 402). Hydrocarbons were measured in terms of carbon one equivalent.

Base fuel used was BPD25 as described below.

| DIESEL ANALYSIS | |
| --- | --- |
| DESCRIPTION OF SAMPLE | BPD25 |
| SAMPLE NO. | 933117 |
| DENSITY @ 15° C. | 0.8373 |
| VISCOSITY @ 20° C. | |
| VISCOSITY @ 40° C. | 2.988 |
| CLOUD POINT ° C. | −3 |
| CFPP ° C. | −17 |
| POUR POINT ° C. | −21 |
| FLASH POINT ° C. | 67 |
| SULPHUR % WT. | 0.17 |
| FIA: - % VOL. SATURATES | 73.2 |
| % VOL. OLEFINS | 1.3 |
| % VOL. AROMATICS | 25.5 |
| | 177.3 |
| 5% VOL. @ ° C. | 199.9 |
| 10% VOL. @ ° C. | 212.9 |
| 20% VOL. @ ° C. | 237.2 |
| 30% VOL. @ ° C. | 255.1 |
| 40% VOL. @ ° C. | 268.8 |
| 50% VOL. @ ° C. | 279.8 |
| 65% VOL. @ ° C. | 295.6 |
| 70% VOL. @ ° C. | 301.1 |
| 85% VOL. @ ° C. | 324.2 |
| 90% VOL. @ ° C. | 334.5 |
| 95% VOL. @ ° C. | 350.7 |
| FBP @ ° C. | 363.9 |
| % VOL. RECOVERY | 98.6 |
| % VOL. RESIDUE | 1.4 |
| % VOL. LOSS | 0.0 |
| C.C.I. (IP 218) | |
| C.C.I. (IP 364) | 53.9 |
| CETANE IMPROVER - TYPE | |
| CETANE IMPROVER - % | NIL |
| CETANE NUMBER | 52.3 |

The following data were obtained at engine speed 1350 rpm, load 55 Nm.

| | | Reduction over base, untreated fuel (%) Smoke and hydrocarbon emissions | | |
| --- | --- | --- | --- | --- |
| Additive | Example | Bosch | Celesco | HC |
| NaTMHD.DMI | 1 | 5.3 | 11.8 | 14.2 |
| NaTMHD.DMI | 1 | 10.2 | 13.7 | 28.6 |
| mean | | 7.8 | 12.8 | 21.4 |
| Sr(TMHD)$_2$.3DMI | 4 | 3.4 | 9.3 | 6.2 |
| Sr(TMHD)$_2$.3DMI | 4 | 8.6 | 7.1 | 10.1 |
| Sr(TMHD)$_2$.3DMI | 4 | 6.7 | 7.6 | 5.6 |
| mean | | 6.2 | 8.0 | 7.3 |
| Ca(TMHD)$_2$.2DMI | 6 | 2.0 | 5.3 | −3.4 |
| K(TMHD).0.5DMI | 7 | 2.7 | 17.9 | 25.0 |
| K(BHT).2DMI | 8 | 10.4 | 3.7 | 12.2 |

The following data were obtained on the same set up, at an engine speed of 1350 rpm, varying the load on the dynamometer as described in the table.

| Compound/(Example) | Reduction over base, untreated fuel (%) Bosch smoke | | | | | |
|---|---|---|---|---|---|---|
| | 10 Nm | 20 Nm | 30 Nm | 40 Nm | 50 Nm | Max. torque |
| Na(TMHD).DMI(1) | 23 | 33 | 30 | 37 | −1 | −13 |
| Sr(TMHD)$_2$.3DMI(4) | 58 | 0 | 11 | 35 | 0 | 1 |
| K(TMHD).0.5DMI(7) | 48 | 39 | 31 | 15 | 8 | 7 |
| K(TMHD).0.5DMI(7) | 43 | 33 | 36 | −9 | −1 | 8 |
| K(BHT).2DMI(8) | 26 | 29 | 20 | 2 | 4 | 6 |
| Na(TMP).DMI(10) | 46 | 16 | 44 | 22 | −5 | −6 |

Static Engine Smoke Reduction Tests

Examples of metal PIBSAs, all prepared from PIBSA obtained as in Example 13 from maleinisation of BP Hyvis XD-35™, were added to a commercial diesel fuel conforming to BS 2869 to provide metal concentrations of 10 mg/kg of fuel and tested in a static Perkins 236-S DI single cylinder research engine. The blend data were as follows:

| Metal | Prepared by method of | Metal atomic | Compound mg/kg fuel | method mg/kg fuel | Metal mg/l fuel |
|---|---|---|---|---|---|
| Sr | Example 14 | 87.62 | 294.0 | 10 | 8.5 |
| Na | Example 12 | 22.99 | 502.5 | 10 | 8.5 |
| K | Example 13 | 39.10 | 293.0 | 10 | 8.5 |

The engine was run at a constant speed of 1400 rev/min at a brake load of 55 Nm. The engine was run on base fuel (non additised), then changed to run on additsed fuel, then returned to running on base fuel, then additised fuel and so on throughout the testing period. Smoke emissions were measured using an AVL 415 Smoke Meter. In this method a volume of gas is drawn through a filter paper and the Filter Smoke Number (FSN) is obtained optically as a funtion of reduced reflectance. A large number of measurements were taken for each fuel, the FSN reduction was defined as the difference between the average FSN on the additised fuel and the average FSN on the adjacent base fuel test (as a percentage of the base fuel test FSN). A series of such tests was conducted with each additive and the average reduction is shown in the table below;

| Metal | Prepared by method of | % reduction of FSN |
|---|---|---|
| Sr | Example 14 | 12.3 |
| Na | Example 12 | 7.1 |
| K | Example 13 | 10.3 |

The above data show the additives of the invention to be effective at reducing engine out emissions from a diesel engine.

Engine Tests

The compounds and compositions of the above-mentioned Examples were tested according to the Test Protocol mentioned above.

Compounds tested in chronological order were:
[Na(PIBSA$_{1000}$)] (Example 2),
[Na tert amylate] (Comparative Example 1),
[{Na(BHT)}$_2$.3DMC] (Example 3),
[Sr(PIBSA$_{1000}$)$_2$] (Example 5),
[Sr(TMHD)$_2$.3DMI] (Example 4),
[Na(TMHD).DMI] (Example 1),
Over based sodium dodecylbenzene sulphonate (Comparative Example 2), and
NaOtBu in propan-2-ol, (as described in DE-A-4041127) (Comparative Example 3).

During the testing period the total distance accumulated was in excess of 30,000 km. As testing progressed the sooting time with base fuel increased, i.e. it became more difficult to eliminate the memory of additised fuels. A typical soot collection running sequence on base fuel was 5.14, 2.78, 2.18, 1.42 and 0.80 hours.

Results

For sodium tertiary amylate (Comparative Example 1) the soot collection running times to achieve 200 mBar were: 0.72, 2.10, 1.80, 9.68 and 4.52 hours. According to the protocol, the additive is regarded as of low effectiveness.

The overbased sodium dodecylbenzene sulphonate (Comparative Example 2) required two sequences of sooting and burn off, after which it ran for some 12 hours. Performance was marginal; on two occasions the exhaust pressure reached 200 mBar. The additive is of low effectiveness.

For sodium butyrate in iso-propanol (Comparative Example 3) the soot collection running times to achieve 200 mBar were: 2.85, 2.61, 2.46, 6.34, 2.53, and 2.22 hours. According to the protocol, this additive is also classified as ineffective.

All other compounds tested were highly effective in preventing filter blocking, according to the test protocol.

Additives are here ranked according to the mean pressure drop across the trap. Low pressure drop reflects ability to maintain trap cleanliness.

| Rank Order | Example | Compound | Fuel Bat. No. | Run Time (hour) | No. forced regens. | Mean trap (mBar) |
|---|---|---|---|---|---|---|
| 1 | 3 | {Na(BHT)}$_2$.3DMC | 950790 | 18.00 | 1 | 65 |
| 2 | 1 | Na(TMHD).DMI | 951398 | 24.00 | 1 | 79 |

-continued

| Rank Order | Example | Compound | Fuel Bat. No. | Run Time (hour) | No. forced regens. | Mean trap (mBar) |
| --- | --- | --- | --- | --- | --- | --- |
| 3 | 2 | Na PIBSA | 950705 | 17.75 | 1 | 80 |
| 4 | C3 | Overbase Na sulphonate | 951811 | 12.00 | 2 | 104 |
| 5 | 4 | Sr(TMHD)$_2$3DMI | 951326 | 20.24 | 2 | 116 |
| 6 | 5 | Sr(PIBSA)$_2$ | | 12.56 | 1 | 117 |

Trap Regeneration Tests Using Cracked Wall Trap

A Peugeot 309 diesel, specified as below, was run in the manner described in the Test Protocol, save that no base fuel was used and the 'Nextel™' fibre trap was replaced by a 'cracked wall' trap prepared from Corning EX80™. Higher dose rates of metal were found to be required in order to obtain 'spontaneous' regeneration of the trap (i.e regeneration without the need to increase engine speed and load). Sodium was blended into the fuel as the salt prepared by the method of Example 17. Results are presented in the form of peak back pressure and corresponding exhaust gas temperature at the trap inlet at onset of spontaneous trap regeneration.

| Model | 309 D |
| --- | --- |
| Body | 4 seat saloon |
| Arrangement | Front wheel drive |
| Kerb Weight kg | 990 |
| Engine type | Diesel indirect injection |
| Swept volume 1 | 1.905, normally aspirated |
| Compression ratio | 23.5:1 |
| Bore, stroke mm | 83, 88 |
| Fuel pump | Rotary type Rotodiesel |
| Transmission | 5 speed manual |

| Test No. | Sodium level ppm | Temp ° C. | Back pressure mBar |
| --- | --- | --- | --- |
| 960663 | 25 | <200 | <200 |
| 960729 | 17 | <210 | <200 |

Acceptable temperature and pressure for spontaneous regeneration lies within the design and operation philosophy of the trap/engine combination, in particular the fuel consumption penalty, due to the back pressure, that is deemed acceptable.

Other modifications will be apparent to those skilled in the art without departing from the scope of the present invention.

What is claimed is:

1. A method of regenerating a particulate filter trap, said method comprising the steps of:
    (a) adding to a fuel before the combustion thereof a composition comprising as the sole organo-metallic complex an organo-metallic complex of a Group I or a Group II metal, wherein the concentration of the metal of the organo-metallic complex in the fuel before combustion is 100 ppm or less, and wherein the organo-metallic complex comprises a Group I or Group II metal salt of an alkyl or alkenyl-substituted succinic acid, and thereafter
    (b) combusting the fuel and passing the combusted gases through a particulate filter trap to collect particles produced during combustion.

2. The method as claimed in claim 1 wherein the concentration of the metal of the organo-metallic complex in the fuel before combustion is 30 ppm or less.

3. The method according to claim 1 wherein the filter trap is a ceramic monolith trap and the concentration of the metal of the organo-metallic complex in the fuel before combustion is 30 ppm or less .

4. The method according to claim 1 wherein the filter trap is a deep bed trap and the concentration of the organo-metallic complex in the fuel before combustion is 30 ppm or less.

5. The method according to claim 1 wherein the organo-metallic complex comprises a complex of Na and/or K.

6. The method according to claim 1 wherein the organo-metallic complex comprises a complex of Sr and/or Ca.

7. The method according to claim 1 wherein the organo-metallic complex is stable to hydrolysis.

8. The method according to claim 1 wherein the organo-metallic complex is fuel soluble.

9. The method according to claim 1 wherein the organo-metallic complex is soluble in a fuel-compatible solvent to the extent of 10 wt % or more.

10. The method according to claim 9 wherein the organo-metallic complex is soluble in the solvent to the extent of 25 wt % or more.

11. The method according to claim 9 wherein the organo-metallic complex is soluble in the solvent to the extent of 50 wt % or more.

12. The method according to claim 1 wherein the organo-metallic complex is derived from the reaction of an alkyl or alkenyl succinic anhydride or its hydrolysis product with a Group I or Group II metal hydroxide or oxide.

13. The method according to claim 1 wherein the organo-metallic complex is dosed to the fuel at any stage in a fuel supply chain.

14. The process for improving the oxidation of carbonaceous products derived from the combustion or pyrolysis of fuel, said process comprising the steps of:
    (a) adding to the fuel before the combustion thereof a composition comprising as the sole organo-metallic complex an organo-metallic complex of a Group I or a Group II metal, wherein the concentration of the metal of the Group I or the Group II organo-metallic complex in the fuel before combustion is 100 ppm or less, and wherein the organo-metallic complex comprises an alkali or alkaline earth metal salt of an alkyl or alkenyl-substituted succinic acid, and thereafter
    (b) passing combusted gases through a particulate filter trap thereby collecting the particles produced during combustion.

15. The process as claimed in claim 14 wherein the concentration of the metal of the Group I or the Group II organo-metallic complex in the fuel before combustion is 30 ppm or less.

16. The process as claimed in claim 14 wherein the filter trap is a ceramic monolith trap and the concentration of the metal of the Group I or the Group II organo-metallic complex in the fuel before combustion is 30 ppm or less.

17. The process as claimed in claim 14 wherein the filter trap is a deep bed trap and the concentration of the metal of the Group I or Group II organo-metallic complex in the fuel before combustion is 30 ppm or less.

18. The process as claimed in claim 14 wherein the Group I organo-metallic complex comprises a complex of Na and/or K.

19. The process as claimed in claim 14 wherein the Group II organo-metallic complex comprises a complex of Sr and/or Ca.

20. The process as claimed in claim 14 wherein the organo-metallic complex is fuel soluble.

21. The process as claimed in claim 14 wherein the organo-metallic complex is dosed to the fuel at any stage in a fuel supply chain.

* * * * *